S. Mann,
Cheese Press,
№ 6,742. Patented Sep. 25, 1849.
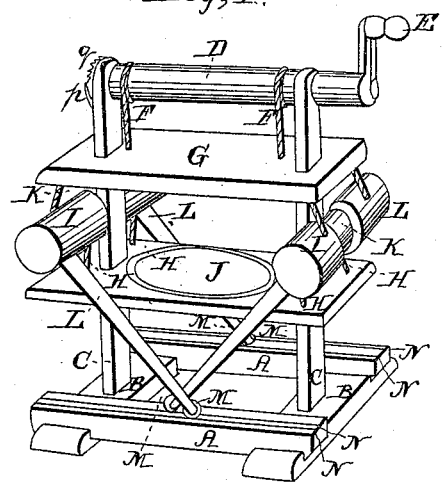
Fig; 1.
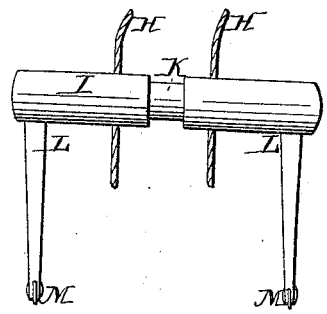
Fig; 2.

UNITED STATES PATENT OFFICE.

SAMUEL MANN, OF ALSTEAD, NEW HAMPSHIRE.

SELF-ACTING CHEESE-PRESS.

Specification of Letters Patent No. 6,742, dated September 25, 1849.

*To all whom it may concern:*

Be it known that I, SAMUEL MANN, of Alstead, in the county of Cheshire and State of New Hampshire, have invented a new and useful Method of Constructing Self-Acting Cheese-Presses; and I hereby declare that the following is a full and exact description, reference being had to the annexed drawings.

Figure 1 is a perspective view of the press. Fig. 2, is a side elevation of one of the rollers with its levers and cores.

Fig. 1, the press, consists of a frame made by locking together the four sills A A, and B B, in the manner represented in the drawing Fig. 1, with the two upright standards C C, in the sills B B, in the upper ends of these standards C C, an axle D with its crank E is supported, and from the axle D two cords F F descend and are made fast in the follower board G which is movable up and down on the standards C C; from this follower board G there are four cords H, H, H, H, descend, one from each corner and two of which pass through each of the rollers I, I, see H, H, the cords, and I, the roller Fig. 2 the cords H, H, H, H, descending from thence and their lower ends made fast in the cheese board or platform J at its corners in the same manner as in the follower board G, the rollers I, I, have each a journal K K, around its center in which the standards C C are placed. L, L, L, L, are four levers, two of which are made fast in each of the rollers I I in the same direction of the cords H H see L L the levers and I the roller Fig. 2, in the end of each of the levers L, L, L, L, there is a friction roller or truck M, M, M, M, see M M, Fig. 2, which are placed in the grooves or ways N, N, N, N, in the sills A A, Fig. 1. O is a circular groove in the cheese board J for the purpose of guiding of the whey, P is a latch, and Q a ratchet wheel on the axle D.

Operation: Turn the axle D by means of the crank E which will raise the follower board G the rollers I I and the cheese board J where they may be kept by engaging the latch P in with the teeth of the ratchet wheel Q. Then place the curd in its hoop and follower in the usual manner within the circular groove O on the cheese board J and liberate the latch P from the ratchet Q when the follower board G the rollers I, I, and the cheese board J will descend along the standards C C and it will be seen that during the descent the levers L, L, L, L, will be brought nearer to a horizontal position as their lower ends pass along on the trucks M, M, M, M, in their ways N N N N, in the cross sills A A, and that the rollers I, I, at the same time will be turned so as to wind the cords H, H, H, H, on to their bodies, thereby bringing the follower G and the cheese board J nearer together.

I do not claim to be the original inventor of the self acting cheese press, but what I do claim as my invention and desire to secure by Letters Patent is—

The employment or application of the rollers I, I, in, connection with the levers L, L, L, L, the rollers I, I, being suspended between the follower board G and the cheese board J, by means of the cords H, H, H, H, (ropes, chains or other suitable suspenders) substantially in the manner and for the purpose above set forth, thereby not merely giving pressure to the cheese but pressing it with a gradually increasing degree of pressure as the follower board G the cheese board J with the cheese between them descend along the standards C, C.

SAMUEL MANN.

Witnesses:
HENRY MELLISH,
ALDIZ LOVELL.